(12) United States Patent
Shrive et al.

(10) Patent No.: US 12,486,770 B2
(45) Date of Patent: Dec. 2, 2025

(54) HYDRAULIC CONTROL CIRCUIT FOR A HYDRAULIC MOTOR

(71) Applicant: Danfoss Power Solutions Gmbh & Co OHG, Neumünster (DE)

(72) Inventors: Chris Shrive, Bridge of Allan (GB); Christian Feller, Handewitt (DE); Matthias Liermann, Neumünster (DE)

(73) Assignee: DANFOSS POWER SOLUTIONS GMBH & CO. OHG, Neumunster (DE)

( * ) Notice: Subject to any disclaimer, the term of this patent is extended or adjusted under 35 U.S.C. 154(b) by 60 days.

(21) Appl. No.: 18/541,945

(22) Filed: Dec. 15, 2023

(65) Prior Publication Data

US 2024/0200454 A1 Jun. 20, 2024

(30) Foreign Application Priority Data

Dec. 20, 2022 (DE) .......................... 102022134056.2

(51) Int. Cl.
*F15B 11/02* (2006.01)
*F01B 1/06* (2006.01)
(Continued)

(52) U.S. Cl.
CPC .......... *F01B 1/0686* (2013.01); *F01B 1/0675* (2013.01); *F01B 25/02* (2013.01); *F15B 11/02* (2013.01); *F16H 61/421* (2013.01)

(58) Field of Classification Search
CPC ............ F15B 2211/355; F15B 2211/67; E02F 9/2253; E02F 9/2285
See application file for complete search history.

(56) References Cited

U.S. PATENT DOCUMENTS 10,316,493 B2 * 6/2019 Fukuda ................. E02F 9/2246
2003/0014172 A1 1/2003 Burgart et al.
(Continued)

FOREIGN PATENT DOCUMENTS

DE 19955965 A1 5/2001
DE 60005600 T2 8/2004
(Continued)

OTHER PUBLICATIONS

First Office Action for European Patent Application No. 23,218,030.7, dated May 16, 2024.
(Continued)

*Primary Examiner* — Thomas E Lazo
(74) *Attorney, Agent, or Firm* — McCormick, Paulding & Huber PLLC

(57) ABSTRACT

A hydraulic control circuit for a hydraulic motor operable at least at two displacements, having a proportional speed control valve with a control valve spool continuously moveable by means of a force generated by a pilot pressure being controlled by a continuously, electrically adjustable pilot valve having an electrical actuator, wherein the control valve spool is moveable between a full-torque end position, a reduced-torque end position, and at least one intermediate position. A time related control current function is provided for controlling the current applied to the electrical actuator for controlling the pilot pressure including a pre-current portion with a constant non-zero current and a current ramp portion during which the current is raised or lowered continuously from a ramp starting current level to an intermediate current level. The current is changed abruptly to a switching current level at the end of the current ramp portion for allowing the movement of the speed control valve spool from one of the two end positions via the at least one intermediate switching position into the other end position.

20 Claims, 5 Drawing Sheets

(51) Int. Cl.
*F01B 25/02* (2006.01)
*F16H 61/421* (2010.01)

(56) References Cited

U.S. PATENT DOCUMENTS

2017/0107695 A1* 4/2017 Fukuda ................ E02F 9/2228
2017/0284063 A1* 10/2017 Fukuda ................ E02F 9/2235
2020/0240113 A1* 7/2020 Fukuda ................. F16H 61/40

FOREIGN PATENT DOCUMENTS

WO        0161186 A1    8/2001
WO     2022126757 A1    6/2022

OTHER PUBLICATIONS

Extended European Search Report for European Patent Application No. 23,218,030.7, dated Apr. 26, 2024; 4 pages.

* cited by examiner

HYDRAULIC CONTROL CIRCUIT FOR A HYDRAULIC MOTOR

CROSS-REFERENCE TO RELATED APPLICATION

This application claims foreign priority benefits under 35 U.S.C. § 119 from German Patent Application No. 102022134056.2, filed Dec. 20, 2022, the content of which is hereby incorporated by reference in its entirety.

TECHNICAL FIELD

The present invention relates to hydraulic motors, in particular to hydraulic motors with multiple speed shifting functionality. The invention further relates to hydraulic control circuits for hydraulic motors. The invention further relates to control units applicable in hydraulic control circuits.

BACKGROUND

Hydraulic motors, in particular radial motors, e.g., orbital motors or radial piston hydraulic motors, are widely used in the art, e.g., for heavy duty applications. For example, radial motors are used in the field of construction, agricultural or forestry equipment. The operating principle of orbital motors is based on the relative movement of an internal gear, e.g., a movable internal gear, with respect to an (e.g., fixed) external gear. In this case, a distributor valve can be driven synchronously by the internal gear through a cardan shaft ensuring that individual chambers of the motor are filled and drained/emptied.

Radial piston motors are characterized in that their working pistons move in radial direction with respect to a central longitudinal/rotational axis, when supplied with pressurized hydraulic fluid. In general, radial piston motors are used in hydraulic applications which do not require high rotational speeds but high torque. Radial piston units show the advantage over axial piston units of a reduced axial construction space.

One specific application of hydraulic motors, in particular radial motors of the cam lobe type of construction, is propelling of work vehicles, e.g., of track loaders. Frequently control circuits are provided in order to enable a controlled variation of the speed and torque provided by the hydraulic motor(s). In some control circuits for varying the speed of rotation for these hydraulic motors of the prior art, the absorption volume of the motor can be changed by means of a valve arrangement, in that the absorption volumes of selected working chambers are selectively neutralized, e.g. This is generally done by short-circuiting the intakes and outlets of the motor working chambers in question, e.g., for a radial piston motor, a piston group that is to be turned on or shut off, for example.

For hydraulic motors, in particular cam lobe radial piston motors, it is common to provide speed control valves, in order to enable shifting between multiple speeds of the hydraulic motors. To facilitate understanding of the speed shifting principle, a hydraulic motor can be split into multiple "sub-motors" which can be supplied by separate fluid flows. If the flow of one of the "sub-motors" is recirculated, this appears to reduce the displacement of the hydraulic motor. Therefore, the speed of the hydraulic motor can be increased without the need for a larger pump.

According to many design variants of hydraulic radial motors, e.g., the cam lobe design or the orbital design, conceptual reasons known by a person skilled in the art mean the displacement of a hydraulic motor cannot be varied continuously. Therefore, speed control valves are provided to switch between pre-defined displacement values. Shifting of the speed control valve leads to a quick de- or acceleration of the hydraulic motor after the changeover. This frequently creates a high shock which may be detectable by the driver and may cause disturbances and loss of controllability of the vehicle, in particular on tough terrain. The operator may be asked to stop the vehicle before switching displacements.

Additionally, as the viscosity of hydraulic fluid is strongly temperature dependent, the systems applied in the prior art are prone to malfunctions due to the influences of temperature variations of the hydraulic fluid and/or the hydraulic motor. This can lead to an increase in response time of the hydraulic components. When driving a hydraulically propelled vehicle, this phenomenon can cause a feeling like the vehicle would be freewheeling.

SUMMARY

It is therefore an objective of the invention to provide a hydraulic control circuit capable of smoothening the speed shifting behaviour of a hydraulic motor and of providing a reliable but also quick shifting behaviour of the hydraulic motor reducing abrupt load alternations as much as possible.

The objective is solved by a hydraulic control circuit, a control unit, a hydraulic motor, and a method according to the independent claims. Preferred embodiments are disclosed in the dependent claims.

A hydraulic control circuit according to the invention is suitable for use in a hydraulic motor operable at least at two displacements. The hydraulic control circuit comprises a proportional speed control valve with a control valve spool. The control valve spool is continuously switchable by means of a force generated by a pilot pressure which is controlled by a continuously, electrically adjustable pilot valve having an electrical actuator.

The control valve spool is switchable between a full-torque end position, a reduced-torque end position, and at least one intermediate position. The intermediate position can be located between the full-torque end position and the reduced-torque end position.

Preferably, in the full-torque end position all working chamber intakes are supplied with hydraulic fluid under high system pressure and all working chamber outlets are connected to low system pressure. In consequence, in the full-torque position, all working chambers are used for generating torque on the rotary power take-off shaft or casing in the course of one revolution of the hydraulic motor, i.e., all working chambers can be supplied with fluid under a high pressure, e.g., working pressure.

For example, when radial piston motor, in particular a usually internally actuated cam-lobe motor, is considered, this means that, in the course of a full revolution, the intakes of each working/chamber is supplied with hydraulic fluid under a high pressure forcing the working piston which is arranged in the respective working cylinder, to move radially outwards. By means of the outward movement of the pistons, the pistons act directly or indirectly on a cam-lobe surface generating a torque which causes the driving shaft or rotary casing of the hydraulic motor to rotate. When the piston is moving radially inwards because it is forced by the shape of a cam of the cam-lobe surface, the corresponding cylinder outlet is connected to a low system pressure and hydraulic fluid is drained from the working chamber/cylinder bore.

Preferably, in the reduced-torque end position a subset of working chamber intakes is hydraulically short-circuited with the corresponding outlets. Therefore, only the working chambers not belonging to the subset of working chambers show the same working behaviour as in the full-torque end position. Consequently, only a portion of the working chambers can be supplied with hydraulic fluid under high pressure. However, another portion, i.e., the subset of the working chamber intakes, is supplied with hydraulic fluid at a reduced pressure, e.g., charge pressure, no matter if the volume of the working chamber increases or decreases. In consequence, groups of working chambers can be hydraulically short-circuited under reduced hydraulic pressure.

In other words, in the full-torque end position of the control valve, the working volume of the hydraulic motor, in particular a cam-lobe radial motor, is the sum of all working volumes enclosed in the working chambers. In the reduced-torque end position, in the course of a full revolution of the hydraulic motor, only a portion of the working chambers is supplied with fluid at a high system pressure. Therefore, only this portion of the working chambers contribute to the working volume of the hydraulic motor. The remaining subset of working chambers can be supplied with a reduced pressure sufficient e.g., to assure contact of the piston rollers with a cam-lobe-surface in the case of a cam-lobe radial piston motor. These working chambers filled with hydraulic fluid with reduced pressure do not contribute to the actual working volume of the hydraulic motor as the corresponding pressure chamber is not supplied with hydraulic fluid under high pressure. Frequently, for the subset of short-circuited working chambers, the hydraulic fluid volume provided to one of the working chambers is simultaneously drawn from another working chamber. In other words, the hydraulic fluid volume necessary to hold the piston roller in contact with the cam-lobe surface and to move one piston outwards is displaced by another piston moving inwardly due to the guidance of the cam-lobe surface.

In the at least one intermediate position hydraulic fluid flow via the speed control valve to the subset of intakes can be throttled. As long as the control valve spool is in the at least one intermediate position, the vehicle can accelerate more smoothly and therefore, the hydraulic shock occurring due to the speed shifting can be reduced or dampened.

The specific design of the speed control valve may vary, e.g., depending on the operational type of the hydraulic motor, i.e., depending on whether the hydraulic motor is operated one-directionally or bi-directionally. A person with skills in the relevant art is aware of many designs of speed control valves which are all intended to be covered by the scope of this application. According to one embodiment, the speed control valve may be designed as a 4-way spool valve, as e.g., disclosed in PCT/CN2020/141046. This is especially preferred, if the hydraulic motor is operable in both directions of rotation, as the design of the spool valve enables the hydraulic motor to work with a comparable efficiency in both directions of rotation.

The speed control may also be designed as a 3-way spool valve, e.g., if the hydraulic motor is only operated with one direction of rotation. Due to the 3-port design, the efficiency of the hydraulic motor may be worse in one direction of rotation in comparison to the other direction of rotation. However, other requirements may drive the integration of a 3-way spool valve, such as the lower complexity of the design or the lower manufacturing effort.

Independently of the number of ports, the speed control valve spool may comprise notches which control the system pressure guided to the working chambers during the intermediate positions of the valve spool. Therefore, the pressure difference between the working chamber intakes and the working chamber outlets which are connected to the ports of the speed control valve can be adjusted. The maximum pressure present at the intakes may be reduced, and thereby the potential de-/acceleration and shock can be limited.

According to the invention a time related control current function is provided for controlling the current applied to an electrical actuator of a pilot pressure control valve. The control current function comprises a pre-current portion along a time span prior to a displacement switching command at a command time. A constant non-zero current which is present during the pre-current portion does not enable a pilot pressure capable of switching the speed control valve spool out of one of its two end positions. Typically, below a minimum current at the actuator, the pilot pressure which is provided by the pilot valve to the control valve is not sufficient to move the control valve spool out of one of its end positions. If the current at the actuator rises above a certain threshold value, the pilot valve and/or the control valve spool can reach its other end position, such that further increasing the current does not lead to a further shifting of the control valve spool.

The control current function further comprises a current ramp portion during a ramp time span ending at a pre-defined/pre-set switching time after the command time. In the current ramp portion, the current is raised or lowered continuously from a ramp starting current level to an intermediate current level. At the end of the current ramp portion, the current is changed abruptly to a switching current level.

It will be understood that the course of the control current function which is provided to the actuator of the pilot valve, directly influences the supply, i.e., the height of the pilot pressure to switch the speed control valve spool. Therefore, by means of the pilot pressure the switching of the speed control valve spool from one of the two end positions via the at least one intermediate switching position into the other end position is enabled.

Preferably, when the control current is in the range of the ramp portion of the control current function, the present control current causes the valve spool to move to the at least one intermediate position. If multiple, e.g., proportional intermediate positions are provided, the valve spool can move along these intermediate positions, when the current is in the range of the ramp portion of the control current function. Therefore, increasing of the ramp time span gives the motor—and therewith the entire vehicle—more time to ac- or decelerate. However, the ramp time span may not be extended for too long as otherwise the driver may have the feeling of losing control over the vehicle.

During the intermediate switching positions of the speed control valve fluid flow to the subset of pressure chambers can be throttled by means of an orifice arrangement, preferably being an integral part of the speed control valve.

Further, the gradient of the current ramp portion can define the shifting velocity of the control valve spool and can be varied, e.g., depending on the temperature of the hydraulic fluid and/or the temperature of the hydraulic motor.

The control current function can further comprise a boost portion at the end of the pre-current level portion at the point of time a switching command is given. In this boost portion the current level can be changed/oscillated abruptly for a short boost time, i.e., raised and lowered, or vice versa, in a peak-like manner. This boost current is intended to "activate/ excite" the control valve spool as this boost current causes a peak in the pilot pressure supplied to the control valve.

Depending on the direction of switching, i.e., depending on whether the hydraulic motor shall be switched from the full-torque end position to the reduced-torque end position or vice versa, the trajectory of the boost portion can be varied.

In the present description, the scenario, when the switching current level is higher than the non-zero pre-current level present in the pre-current portion, is called up-shifting event. In contrast, when the switching current level is lower than the non-zero pre-current level present in the pre-current portion, the scenario is called down-shifting event. It becomes apparent to a person with skills in the relevant art, that the inclination, i.e., the gradient of the ramp portion of the control current function is positive in the case of an up-shift event, and in the case of a downshift event, the gradient/incline of the ramp portion of the control current function is negative. In extreme cases the gradient of the ramp portion for both cases can be select to zero, i.e., the control current during the ramp portion time is constant.

In the sense of the invention the terms up-shifting and down-shifting are merely used with regard to an increasing or decreasing control current supplied to the pilot valve for achieving a change in the pilot pressure level acting on the speed control valve spool. It is not essential for the inventive idea whether the hydraulic motor is at high speed or at high torque when the pilot pressure level is maximum or minimum. As this is mere a development point for a person with skills in the relevant art, all possible and realistic combinations of initial valve positions and possibilities of switching the speed control valve from the initial end-position to the other end-position via intermediate positions by the help of the pilot valve are covered by the claimed invention.

The current level can be raised in an up-shifting event at the time a switching command occurs to a current boost level higher than the starting current level and lowered abruptly at the end of the boost time to the ramp starting current level. Alternatively, the current level can be lowered in a down-shifting event at the time a switching command occurs to a current boost level lower than the ramp starting current level and raised abruptly at the end of the boost time to the ramp starting current level. In both cases, the ramp starting current level can be different from the pre-current level or can be equal to the pre-current level.

When the ramp starting current level is different from the pre-current level, and no boost portion is provided, the current can also be raised abruptly from the pre-current level to the ramp starting current level at the point of time a command is given (further: command time).

The ramp portion for an up-shifting event can start right after the boost time with a ramp starting current level higher than the pre-current level. The ramp portion for an up-shifting event may end after a pre-set switching time period after the command time at an intermediate current level lower than the switching current level. The intermediate current level can be raised abruptly at the end of the pre-set switching time to the switching current level.

For a down-shifting event, the ramp portion can start right after the boost time with a ramp starting current level lower than the pre-current level and may end after a pre-set switching time after the command time period at an intermediate current level higher than the switching current level. In this case, the intermediate current level can be lowered abruptly at the end of the pre-set switching time to the switching current level.

Any current level of the control current function, in particular the pre-current level, the current boost level, the ramp starting current level, the intermediate current level and/or the switching current level of the control current function, can according to the invention be varied depending on the temperature of the hydraulic fluid and/or depending on the temperature of the hydraulic motor and/or any other hydraulic component of the hydraulic system/vehicle.

As a general rule, the magnitude of the boost may increase with decreasing temperatures. Simultaneously or alternatively, the ramp gradient may increase, when the temperature decreases.

In consequence, in an upshift event, the boost current level may be increased in relation to the pre-current level, when the temperature decreases. For a downshift event, the pre-current level is normally higher than the magnitude of the boost current level. Therefore, the magnitude of the boost current level may be further decreased in relation to the pre-current level when the temperature decreases. In other words, the difference between the pre-current level and the boost current level can be increased, when the temperature of the hydraulic fluid and/or the hydraulic motor decreases.

Increasing the ramp gradient means that for a constant ramp time span, the difference between the ramp starting current level and the intermediate current level is increased. Therefore, in the case of an upshift event, the ramp starting current level and/or the intermediate current level may be increased with respect to the pre-current level, when the temperature decreases. In a downshift event, the ramp starting current level and/or the intermediate current level may be further decreased in relation to the pre-current level when the temperature decreases. Not necessarily, the difference between the ramp starting current level and the intermediate current level has to be increased, when the temperature of the hydraulic fluid and/or the hydraulic motor is decreased, but it is covered by the invention to do so in order to achieve a smooth up- or down-shifting.

Also, any point in time related to the control current function or any time span related to the control current function, in particular the time span prior to the command time, the boost time, the ramp time span, the pre-set switching time span and/or the command time, may be varied depending on the temperature of the hydraulic fluid and/or depending on the temperature of the hydraulic motor and/or any other hydraulic component of the hydraulic system/vehicle.

According to the invention a control unit may be provided to control the current guided to the electrical actuator of the pilot valve based on the control current function which can be stored in a storage means of the control unit. The control unit can be an integrated part of another control unit, or it can be a distinct control unit with the purpose of controlling the current of the electrical actuator. The control unit may be a physical unit, but it may also be a software block implemented as a subunit of another control unit. This means, that the control unit according to the invention is not necessarily physically separated from another control unit. It can also physically be integrated to another control unit.

The control unit can receive feedback signals of at least one sensor adapted to measure an operational parameter of the hydraulic control circuit, a hydraulic motor or of a vehicle to which the hydraulic control circuit is installed. For example, the temperature of the hydraulic fluid in a hydraulic hose or pipe in or connected to a hydraulic motor or the temperature of the hydraulic motor itself may be measured. The control unit may adapt the control current function based on the received feedback signals. This means that the current levels and/or the relevant point in time and/or the time spans of the control current function can be adjusted corresponding to the received feedback signals. A person with skills in the relevant art will find a lot of other possibilities to obtain a feedback signal about the operational condition of the hydraulic system to which the control circuit according to the invention is installed.

The control unit may be configured for controlling and/or adjusting a current to an electrical actuator of a pilot valve of a hydraulic control circuit based on the control current function which is stored in storage means of the control unit. Preferably, the current is controlled according to an iteratively adapted current control function.

The control unit may adapt/vary/change the current control function, e.g., in regular intervals, based on a trigger signal, e.g., when the feedback signal surpasses a threshold value, and/or according to a pre-set pattern and/or in certain circumstances, e.g., when starting the hydraulic system or vehicle or a working tool of the hydraulic system or vehicle has been changed.

A hydraulic motor equipped with a hydraulic control circuit according to the invention can be configured to be operated one-directionally or bi-directionally. The design of the proportional speed control valve may be different, depending on the type of operation of the hydraulic motor, i.e., it may depend on whether the hydraulic motor is operated bi-directionally or uni-directionally. Although the underlying functional principle of the invention has been explained by means of a radial piston motor as an example on several occasions, a hydraulic control circuit and a control according to the invention may be integrated into any type of hydraulic motor. In particular the invention may be used with any multi-stroke axial and radial piston motors, for example, hydraulic motors according to the planetary wheel principle, i.e., so-called gerotors, or piston motors with stepped pistons. The invention may also be used for hydraulic radial motors other than hydraulic radial piston motors, in particular for hydraulic orbital motors.

According to the invention, a method is provided for controlling the up-shifting and/or down-shifting between at least two displacement conditions of a hydraulic motor by means of a hydraulic control circuit. The hydraulic control circuit comprises a control current function and the method comprises at least the following steps:

a) Applying during operation of the hydraulic motor and when the speed control valve spool is in an initial end position, a non-zero pre-current to the electrical actuator of the pilot valve until a displacement switching command is given;

b) Applying during a ramp time span and according to a current ramp portion of the control current function and after a displacement switching command is given, a continuously increasing or decreasing current to the electrical actuator starting from a ramp starting current level to an intermediate current level and abruptly changing the current at the end of the current ramp portion to a switching current level in order to shift the pilot valve spool and to guide in a controllable manner a time-related adapted pilot pressure towards the speed control valve spool capable of switching the speed control valve spool from one initial end-position to the other, non-initial end position;

c) Keeping the switching current level in order to hold the speed control valve spool in its other, non-initial end position by means of a maximum or minimum pilot pressure until the next displacement switching command is given.

After step a) and before step b), the method according to the invention may further comprise the following step b.1):

b.1) Applying when a displacement switching command is given, a boost current to the electrical actuator of the pilot valve for a boost timespan, wherein the boost current level of the boost current is different from the pre-current level.

As explained above in context with the hydraulic control circuit, the normal operation time, —if present—the boost time span, the ramp time span, the pre-set switching time span and/or the command point in time, the pre-current level, —if present—the current boost level, the ramp starting current level the intermediate current level and/or switching current level of the control current function can depend on the temperature of the hydraulic fluid and/or the temperature of the hydraulic motor and/or any other hydraulic component of the hydraulic system/vehicle.

BRIEF DESCRIPTION OF THE DRAWINGS

In the following by the help of the annexed Figures, exemplary embodiments of a hydraulic control circuit according to the invention are described. The presented embodiments are not intended to limit the scope of the invention. The Figures show.

DETAILED DESCRIPTION

For illustration and legibility purposes only, in all presented Figures the same functional parts are indicated with same reference numbers.

Figure 1:
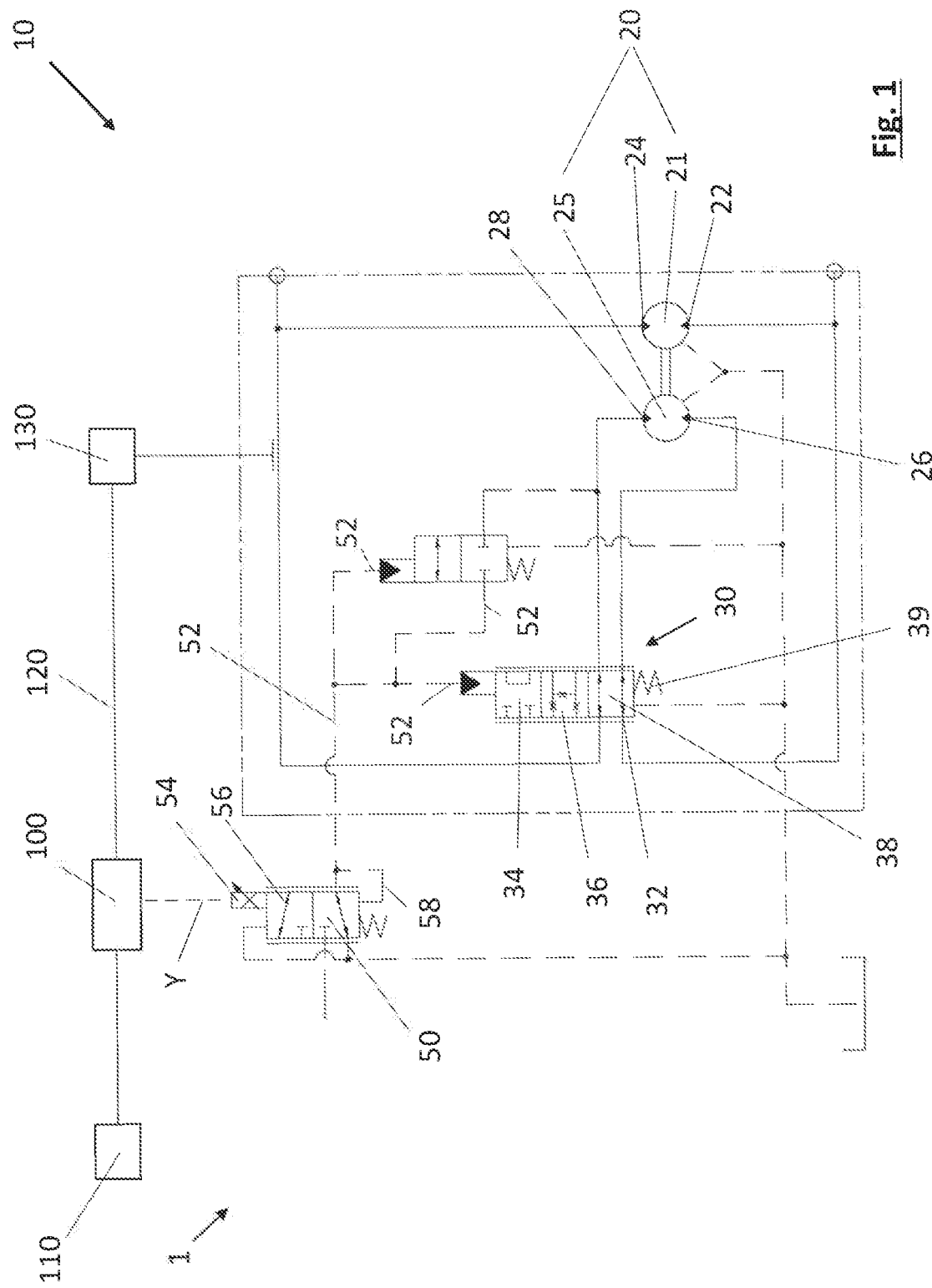
FIG. 1 shows a schematic representation of a hydraulic control circuit according to the invention.

FIG. 1 shows a schematic representation of a hydraulic control circuit 10 according to the invention. The hydraulic control circuit 10 can for example be used to control a hydraulic motor 20 which is installed to a vehicle 1. The hydraulic motor 20 is split into two subunits 21 & 25, in order to improve traceability of the further explanations. The working chambers of the first hydraulic motor subunit 21 comprise intakes 22 and outlets 24. A subset of intakes 26 and a corresponding subset of outlets 28 belongs to the second subunit 25 of the hydraulic motor 20. Both subunits 21 & 25 of the hydraulic motor 20 can be supplied with hydraulic fluid separately. The intakes 22 of the first subunit 21 of the hydraulic motor 20 can be connected to a high system or working pressure, and, e.g., the outlets 24 of the first subunit 21 of the hydraulic motor 20 can be connected to a low system or working pressure.

The hydraulic fluid flow to and from the subset of intakes 26 and the subset of outlets 28 is controlled by a speed control valve 30. A speed control valve spool 38 of the speed control valve 30 is continuously movable between a full-torque end position 32 and a reduced-torque position 34. On its way from one end position to the other, the speed control valve spool 38 passes at least one intermediate position 36. In the intermediate position 36, the hydraulic fluid flow to the subset of intakes 26 passing the control valve 30 is throttled. Additionally, the hydraulic fluid flow from the outlets 28 is throttled too. Herewith a throttled connection between the intakes 26 and the outlets 28 is established at the same time. Thereby, an intermediate maximum pressure difference is established between the subset of intakes 26 and the subset of outlets 28. The intermediate pressure difference is smaller than the pressure difference in the full torque position, but higher than the pressure difference, when the subset of intakes 26 is short-circuited with the subset of outlets 28, as in this case the pressure difference is approximately zero.

The speed control valve spool 38 is pre-tensioned towards the full torque position 34 by a control valve spring 39. A pilot pressure 52 is capable of generating a switching force on the control valve spool 38 that acts against the force of control valve spring 39. Once the switching force generated by the pilot pressure 52 exceeds a threshold, the speed control valve spool 38 starts shifting towards the reduced-torque end position 34 via at least one intermediate position 36.

The pilot pressure 52 is controlled by a pilot valve 50 which in operation of the hydraulic system is continuously operated by an electrical actuator 54. The electrical actuator 54 acts on a pilot valve spool 56, in order to adjust the cross section of flow channels in the pilot valve 50. Therewith, the pilot pressure 52 is adjusted. A pilot valve spring 58 is arranged on the opposite side of the actuator 54 at the pilot valve spool 56 and generates a restoring force on the pilot valve spool 56 such that the pilot pressure is low when the electrical actuator 54 is charged by low control current Y In the depicted embodiment, the higher the current Y through the electrical actuator 54 is, the more the pilot valve spool 56 is shifted towards the spring 58.

The current Y can be provided to the electrical actuator 54 according to a control current function 60. In the following embodiments the control current function 60 comprises a non-zero pre-current portion 62, followed by a boost current portion 66. Subsequent a boost current portion 66 and a ramp portion 64 are provided. At the end, the control current function 60 comprises a switching current portion 68.

Figure 2:
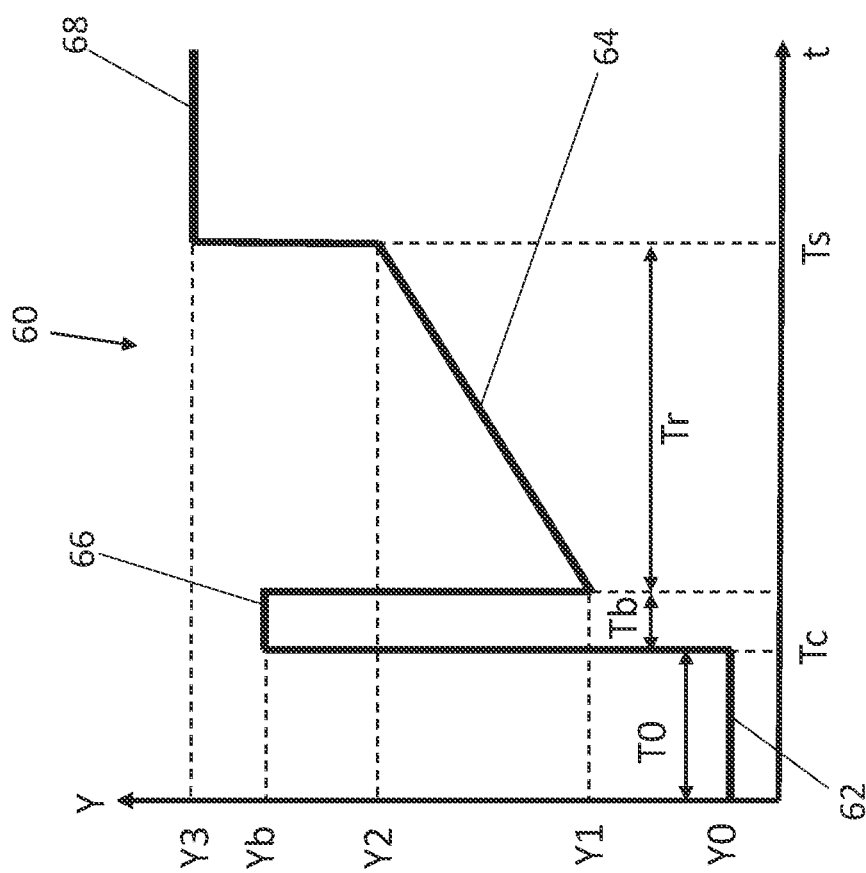
FIG. 2 shows an example of a control current function according to the invention, e.g., designed for an upshift event.

FIG. 2 depicts an example of a control current function 60 according to the invention, e.g., designed for an upshift event. In an upshift event, the current Y is increased from a low pre-current level Y0 to a high switching current level Y3.

Before a switching command is provided at a point in time Tc, a non-zero pre-current level Y0 is present at the electrical actuator 54 to form a non-zero pre-current portion 62. This time span, in which the pre-current level Y0 is present, is called (present) operation time T0. After the point in time of the switching command Tc, the current Y is increased to a boost current level Yb and the boost current portion 66 is started. This current level Yb is maintained for the boost time span Tb, for example to overcome the static forces acting on the pilot valve spool 56 and to reduce the lag time required for starting movement of the pilot valve spool 56, i.e., to excite the control valve spool 38 by a first pilot pressure peak.

After the boost time span Tb, the current Y is lowered to a ramp starting current level Y1 which marks the start of the current ramp portion 64. In the current ramp portion 64, the current Y is continuously increased to an intermediate current level Y2 during a ramp time span Tr. The curve/graph of the ramp portion can be linear, a quadratic function, a cubic function, or any other curve. When the intermediate current level Y2 is reached after the ramp time span Tr, at a pre-set switching point in time Ts, the current level is abruptly increased to a switching current level Y3.

As the current Y is gradually build up during the ramp portion 64, pressure peaks occurring due to the shifting of the speed control valve spool 38 are reduced. Therewith, the acceleration of the vehicle 1 and the resulting shock are limited.

Figure 3:
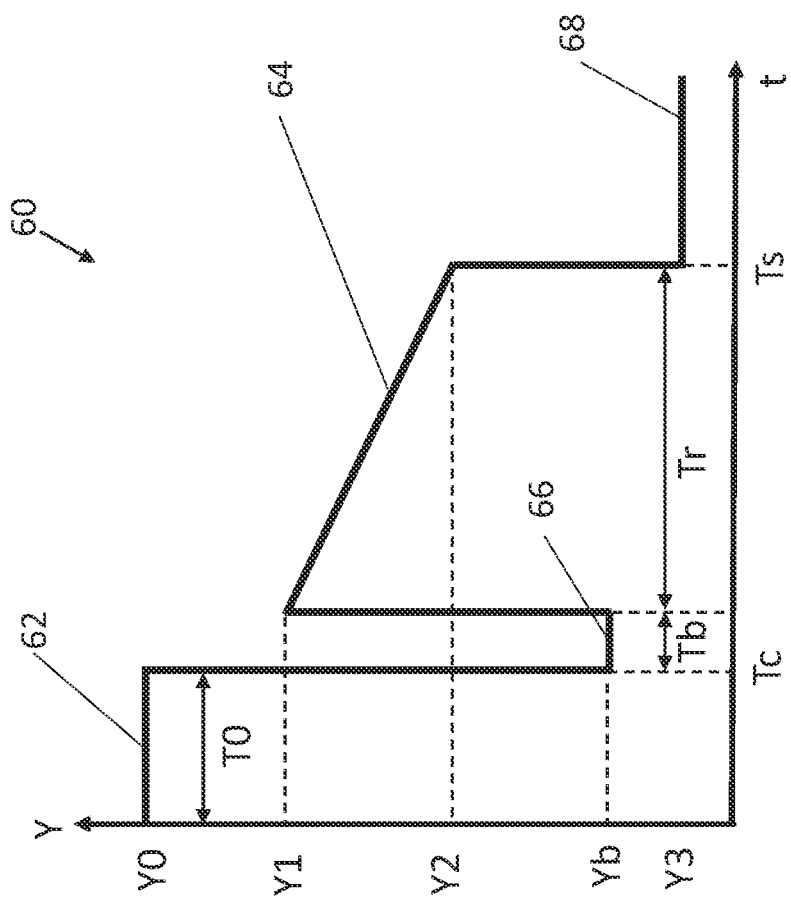
FIG. 3 shows an example of a control current function according to the invention, e.g., designed for a downshift event.

FIG. 3 shows an example of a control current function 60 according to the invention, e.g., designed for a downshift event. In a downshift event, the current Y present at the electrical actuator 54 is reduced from a high pre-current level Y0 to a low switching current level Y3. The pre-current level Y0 is present during a (present) operation time T0 and constitutes a non-zero pre-current portion of the 62 of the control current function 60.

At the time Tc at which a switching command Tc is provided, the current Y is reduced abruptly to a boost current level Yb, and the boost current portion 66 of the control current function 60 starts. In the boost current portion 66, the boost current level Yb is maintained for the boost time Tb. After the boost time Tb, the current level is increased abruptly again to the ramp starting current level Y1 of the ramp portion 64. During the ramp time span Tr, the current is decreased continuously until the intermediate current level Y2 of the ramp portion 64 is reached. At a pre-set switching time Ts, the current Y is decreased abruptly to the switching current level Y3, and the switching current portion 68 of the control current function 60 is started in which the actuator 54 supplied with current level Y3 is able to move the pilot valve spool 56 to generate a sufficient to move the pilot valve spool against the pilot valve spring 58 biasing the pilot valve spool 38 into its initial position in which the pilot pressure can be maximum or minimum depending on the design of the pilot valve 50 and the requirements of the hydraulic control circuit 10 with respect to the functioning of control valve 30.

For example, the hydraulic motor 20 can be in high or low speed mode when the speed control valve 30 is in its initial position in which the speed control valve spool 38 can be held in its initial position either by the control valve spring 39 or by maximum pilot pressure. The different alternatives to operate the hydraulic control circuit 10 according to the invention are apparent to a person with skills in the relevant art and therefore covered by the claimed invention.

Figure 4:
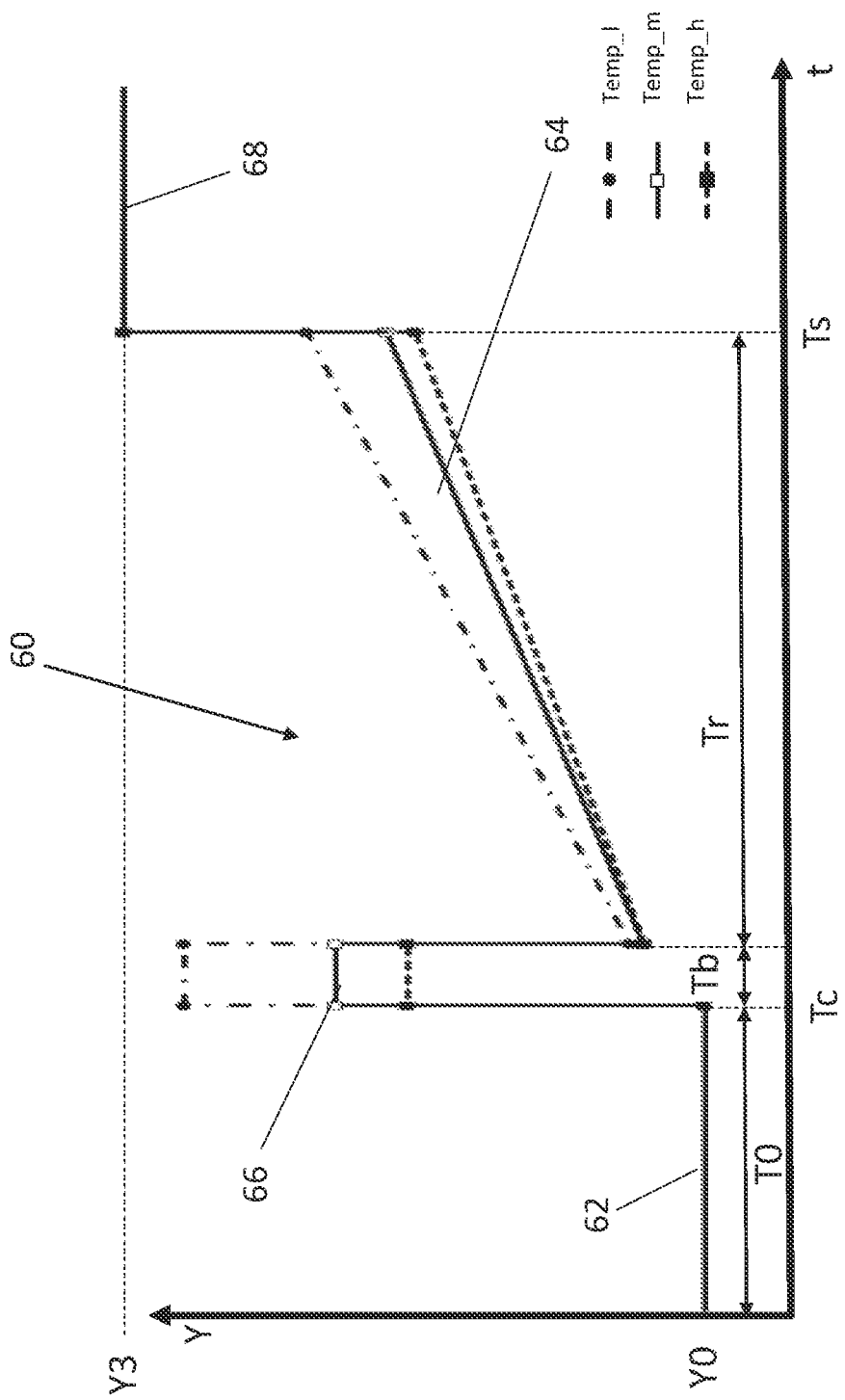
FIG. 4 shows various control current functions according to the invention, e.g., designed for upshift events.
Figure 5:
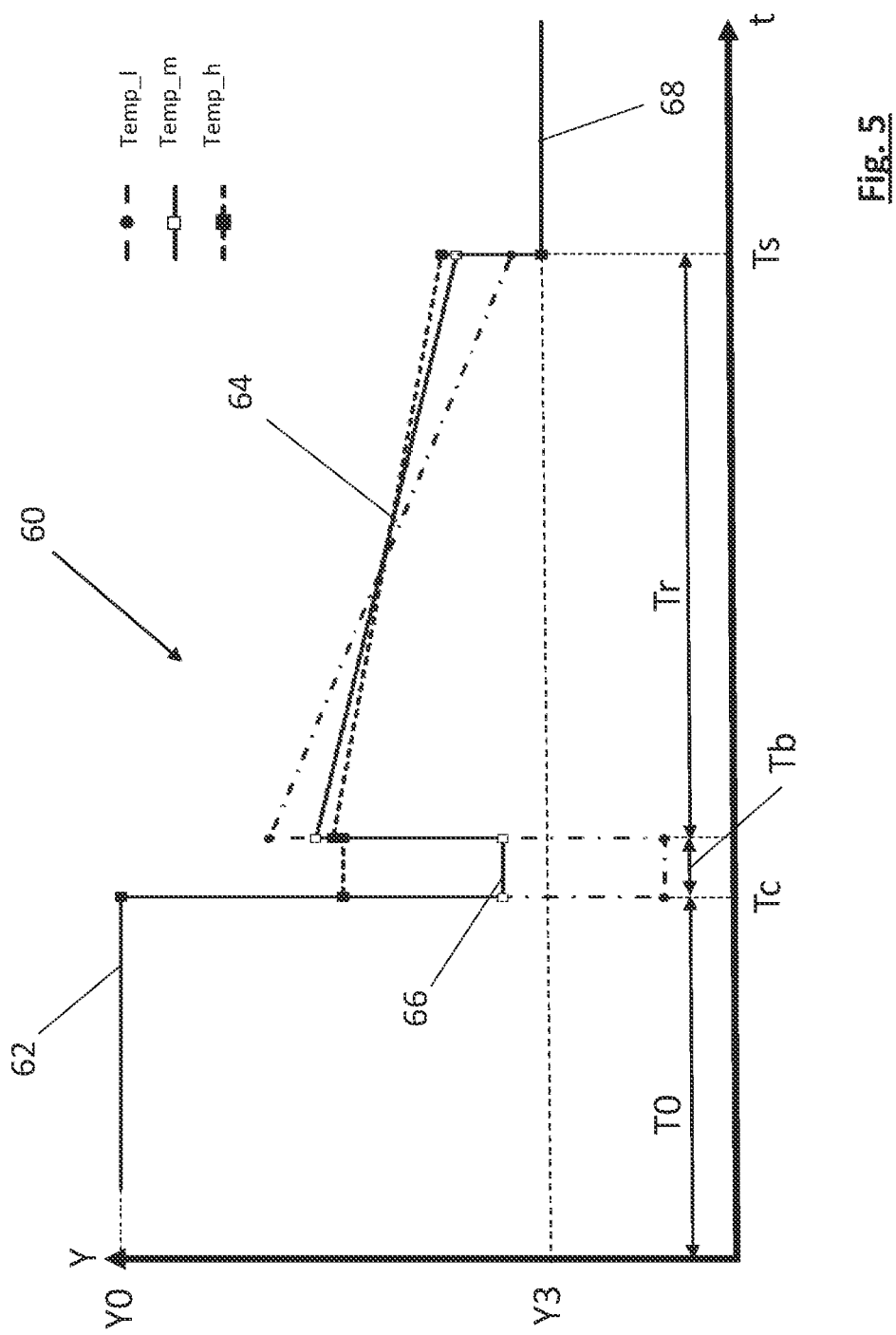
FIG. 5 shows various control current functions according to the invention, e.g., designed for downshift events.

FIG. 4 shows various examples for control current functions 60 according to the invention, e.g., designed for upshift events. FIG. 5 shows various examples for control current functions according to the invention, e.g., designed for downshift events. In both Figures, three exemplary curves of control current functions 60 are depicted. Each curve relates to a different temperature of the hydraulic fluid or to a different temperature of the hydraulic motor 20. The curve with the dash-dotted line relates to a low temperature Temp_1 of the hydraulic fluid or of the hydraulic motor 20. Cold operating temperatures cause a high lag when operating the speed control valve 30. Therefore, the control current function 60 related to the coldest temperature comprises the most significant boost portion 66—i.e., the highest difference between pre-current level Y0 and boost current level Yb—, and the steepest inclination of the ramp portion 64.

The curve with the solid line relates to a medium temperature Temp_m of the hydraulic fluid or of the hydraulic motor 20. In comparison to the curve related to the lowest temperature Temp_1, the curve with medium temperature Temp_m comprises—with regard to absolute values —a lower boost portion and a less steep ramp portion. The warmer the hydraulic fluid of a hydraulic motor 20 becomes, the lower is the viscosity of the hydraulic fluid. Therefore, for higher temperatures, the lag when starting to operate the speed control valve 30 is reduced for higher operating temperatures. In consequence, the difference between the pre-current level Y0 and the boost current level Yb and the gradient of the ramp portion 64 can be reduced.

The curve with the dashed line relates to a high temperature Temp_h of the hydraulic fluid or of the hydraulic motor 20. Here, the difference between the boost current level Yb and the pre-current level Y0 is at its minimum in comparison to the other presented curves. Additionally, the gradient of the ramp portion 64 is relatively low.

Due to the adaption of the different control current functions 60 to the current temperature of the hydraulic fluid and/or of the hydraulic motor 20, the operational behaviour of the hydraulic control circuit 10 feels similar even when the hydraulic control circuit 10 is operated under varying operating conditions. In consequence, the feeling that is provided to an operator becomes independent of the temperature and the comfort when operating a hydraulic vehicle is improved.

From the above disclosure and accompanying Figures and claims, it will be appreciated that the hydraulic control circuit, the control unit, the hydraulic motor, and the method according to the invention offer many possibilities and advantages over the prior art. It will be appreciated further by a person skilled in the relevant art that further modifications and changes known in the art could be made to the hydraulic control circuit, the control unit, the hydraulic motor, and the method according to the invention without parting from the spirit of this invention. Therefore, all these modifications and changes are within the scope of the claims and covered by them. It should be further understood that the examples and embodiments described above are for illustrative purposes only and that various modifications, changes, or combinations of embodiments in the light thereof, which will be suggested to a person skilled in the relevant art, are included in the spirit and purview of this application.

What is claimed is:

1. A hydraulic control circuit for hydraulic fluid for a hydraulic motor operable at least at two displacements, comprising a proportional speed control valve with a control valve spool continuously moveable by means of a force generated by a pilot pressure being controlled by a continuously, electrically adjustable pilot valve having an electrical actuator, wherein the control valve spool is moveable between:
    a full-torque end position,
    a reduced-torque end position, and
    at least one intermediate position,
    wherein a time related control current function is provided for controlling the current applied to the electrical actuator for controlling the pilot pressure, wherein the control current function comprises:
    a pre-current portion along a normal operation time span prior to a displacement switching command at a command time during which pre-current portion a pre-current level does not generate a pilot pressure level allowing the speed control valve spool to move out of one of its two end positions,
    a current ramp portion during a ramp time span ending at a pre-set switching time after the command time, wherein the current is raised or lowered continuously in that current ramp portion from a ramp starting current level to an intermediate current level and is changed abruptly to a switching current level at the end of the current ramp portion for allowing by means of the pilot pressure the movement of the speed control valve spool from one of the two end positions via the at least one intermediate switching position into the other end position.

2. The hydraulic control circuit according to claim 1, wherein in the full-torque, end position all working chamber intakes are supplied with hydraulic fluid under high system pressure and all working chamber outlets are connected to low system pressure.

3. The hydraulic control circuit according to claim 1, wherein in the reduced-torque end position a subset of working chamber intakes is hydraulically short-circuited with the corresponding outlets.

4. The hydraulic control circuit according to claim 3, wherein in the at least one intermediate switching position hydraulic fluid flow via the speed control valve to the subset of intakes is throttled.

5. The hydraulic control circuit according to claim 4, wherein during the intermediate switching position of the speed control valve fluid flow to the subset is throttled by means of an orifice arrangement, preferably being an integral part of the speed control valve.

6. The hydraulic control circuit according to claim 1, wherein the gradient of the current ramp portion defines the shifting velocity of the control valve spool and can be varied depending on the temperature of the hydraulic fluid and/or the hydraulic motor.

7. The hydraulic control circuit according to claim 1, wherein the ramp starting current level is different from the pre-current level, and the current is raised abruptly from the pre-current level to the ramp starting current level at the command time.

8. The hydraulic control circuit according to claim 1, wherein the control current function further comprises a boost portion at the end of the pre-current level portion at the command time, in which boost portion a boost current level for a short boost time is abruptly:
    i. raised in an up-shifting event at the time a switching command occurs to a current boost level higher than the ramp starting current level and lowered abruptly at the end of the boost time to the ramp starting current level, or
    ii. lowered in a down-shifting event at the time a switching command occurs to a current boost level lower than the ramp starting current level and raised abruptly at the end of the boost time to the ramp starting current level,
    wherein the ramp starting current level is different from the pre-current level.

9. The hydraulic control circuit according to claim 8, wherein the ramp portion for an up-shifting event starts after the boost time at a ramp starting current level higher than the pre-current level and ends after a pre-set switching time at an intermediate current level lower than the switching current level, wherein the intermediate current level is raised abruptly at the end of the pre-set switching time to the switching current level.

10. The hydraulic control circuit according to claim 8, wherein the ramp portion for a down-shifting event starts after the boost time at a ramp starting current level lower than the pre-current level and ends after a pre-set switching time at an intermediate current level higher than the switching current level, wherein the intermediate current level is lowered abruptly at the end of the pre-set switching time to the switching current level.

11. The hydraulic control circuit according to claim 8, wherein the difference between the pre-current level and the boost current level is increased when the temperature of the hydraulic fluid and/or the hydraulic motor is lowered.

12. The hydraulic control circuit according to claim 1, wherein the normal operation time span, the ramp time span, the pre-set switching time and/or the command time, the pre-current level, the ramp starting current level, the intermediate current level and/or the switching current level of the control current function can be varied depending on a temperature of the hydraulic fluid and/or of the hydraulic motor.

13. The hydraulic control circuit according to claim 12, wherein the difference between the ramp starting current level and the intermediate current level is increased, when the temperature of the hydraulic fluid and/or the hydraulic motor is lowered.

14. The hydraulic control circuit according to claim 1 comprising a control unit controlling the current to the electrical actuator of the pilot valve based on the control current function.

15. The hydraulic control circuit according to claim 14, wherein the control unit receives a feedback signal of at least one sensor adapted to measure an operational parameter of the hydraulic control circuit, the hydraulic motor or of a vehicle to which the hydraulic control circuit is installed and adapts the control current function based on the received feedback signal.

16. A control unit configured for controlling a current to an electrical actuator of a pilot valve of the hydraulic control circuit according to claim 1.

17. A hydraulic motor, equipped with the hydraulic control circuit according to claim 1, wherein the hydraulic motor is adapted to be operated one-directionally or bi-directionally.

18. A method for controlling the up-shifting and/or down-shifting between at least two displacement conditions of a hydraulic motor by means of the hydraulic control circuit according to claim 1 having a control current function, the method comprising the following steps:
 a) applying during operation of the hydraulic motor and when the speed control valve spool is in an initial end position a non-zero pre-current to the electrical actuator of the pilot valve until a displacement switching command is given;
 b) applying during a ramp time span and according to a current ramp portion of the control current function after a displacement switching command is given a current to the electrical actuator continuously increasing or decreasing from a ramp starting current level to an intermediate current level and abruptly changing at the end of the current ramp portion to a switching current level in order to shift the pilot valve spool and to guide a changed pilot pressure towards the speed control valve spool allowing the switching of the speed control valve spool to the other, non-initial end position;
 c) keeping the switching current level in order to hold the speed control valve spool in its other, non-initial end position by means of a maximum or minimum pilot pressure level until the next displacement switching command is given.

19. The method according to claim 18, further comprising the following step b.1) after step a) and before step b):
 b.1) applying when a displacement switching command is given a boost current to the electrical actuator of the pilot valve for a boost time, wherein a boost current level of the boost current is different from the pre-current level.

20. The method according to claim 18, wherein the normal operation time span, the ramp time span, the pre-set switching time and/or the command time, the pre-current level, the ramp starting current level, the intermediate current level and/or the switching current level of the control current function depends on a temperature of the hydraulic fluid and/or of the hydraulic motor.

* * * * *